(12) United States Patent
Sato et al.

(10) Patent No.: US 12,031,955 B2
(45) Date of Patent: Jul. 9, 2024

(54) COLLISION PERFORMANCE EVALUATION TEST METHOD AND APPARATUS FOR AUTOMOBILE BODY PART

(71) Applicant: JFE STEEL CORPORATION, Tokyo (JP)

(72) Inventors: Kentaro Sato, Tokyo (JP); Hideaki Kobiki, Tokyo (JP); Takayuki Futatsuka, Tokyo (JP); Tomohiro Sakaidani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 342 days.

(21) Appl. No.: 17/639,627

(22) PCT Filed: Sep. 26, 2019

(86) PCT No.: PCT/JP2019/037784
§ 371 (c)(1),
(2) Date: Mar. 2, 2022

(87) PCT Pub. No.: WO2021/059425
PCT Pub. Date: Apr. 1, 2021

(65) Prior Publication Data
US 2022/0291103 A1    Sep. 15, 2022

(51) Int. Cl.
*G01N 3/307* (2006.01)
*G01N 3/02* (2006.01)
(Continued)

(52) U.S. Cl.
CPC .............. *G01N 3/307* (2013.01); *G01N 3/02* (2013.01); *B62D 25/04* (2013.01); *B62D 25/06* (2013.01);
(Continued)

(58) Field of Classification Search
CPC .... G01N 3/307; G01N 3/02; G01N 2203/001; G01N 2203/0048; G01N 2203/04;
(Continued)

(56) References Cited

U.S. PATENT DOCUMENTS

2012/0136640 A1   5/2012   Ito et al.
2013/0061652 A1   3/2013   Wittmann et al.
(Continued)

FOREIGN PATENT DOCUMENTS

CN    102472683 A    5/2012
CN    203974952 U    12/2014
(Continued)

OTHER PUBLICATIONS

Sep. 9, 2022 Search Report Issued in European Patent Application No. 19 946 660.8.
(Continued)

*Primary Examiner* — Eric S. McCall
*Assistant Examiner* — Timothy P Graves
(74) *Attorney, Agent, or Firm* — Oliff PLC

(57) ABSTRACT

A translation control and rotation control mechanism support jig for supporting a front end portion of an automobile body part includes a pair of support members, a rotary box having an L-shaped plate, a rotary shaft pin, a compression pin, and a connection plate. The translation control mechanism includes a support plate, a slide guide, an automobile body part securing disk, a translation plate, and a compression pin. Energy-absorbing members are disposed in an arcuate guide groove on a side surface of the rotary box and a linear guide groove arranged on the support plate or the translation plate. A collision punch collides at a test speed with the L-shaped plate of the rotary box. The compression pin deforms the energy-absorbing members to apply torque (Continued)

opposite to a rotation direction and a reaction force in an opposite direction to a translation direction.

18 Claims, 9 Drawing Sheets

(51) Int. Cl.
*B62D 25/04* (2006.01)
*B62D 25/06* (2006.01)

(52) U.S. Cl.
CPC .................. *G01N 2203/001* (2013.01); *G01N 2203/0048* (2013.01); *G01N 2203/04* (2013.01)

(58) Field of Classification Search
CPC ... B62D 25/04; B62D 25/06; G01M 17/0078; G01M 7/08
See application file for complete search history.

(56) References Cited

U.S. PATENT DOCUMENTS

| | | |
|---|---|---|
| 2015/0021936 A1 | 1/2015 | Nusier et al. |
| 2016/0223433 A1 | 8/2016 | Belwafa et al. |
| 2016/0290894 A1 | 10/2016 | Ito et al. |
| 2017/0350791 A1 | 12/2017 | Belwafa et al. |

FOREIGN PATENT DOCUMENTS

| | | | | |
|---|---|---|---|---|
| CN | 105814422 A | 7/2016 | | |
| CN | 106813928 A | 6/2017 | | |
| CN | 207007522 U | 2/2018 | | |
| CN | 207751665 U | 8/2018 | | |
| DE | 10 2010 014 521 A1 | 10/2010 | | |
| EP | 1 160 560 A1 | 12/2001 | | |
| ES | 2 303 806 A1 | 8/2008 | | |
| JP | 4902027 B2 | 3/2012 | | |
| JP | 2016-061725 A | 4/2016 | | |
| JP | 2016-075489 A | 5/2016 | | |
| KR | 10-2012-0001003 A | 1/2012 | | |
| KR | 20120001003 A | * | 1/2012 | ............... G01N 3/08 |
| KR | 10-2018-0077924 A | 7/2018 | | |
| KR | 20180077924 A | * | 7/2018 | ........ G01M 17/0078 |
| WO | 2011/016499 A1 | 2/2011 | | |

OTHER PUBLICATIONS

Dec. 9, 2023 Office Action issued in Chinese Patent Application No. 201980099137.8.
Dec. 3, 2019 Search Report issued in International Patent Application No. PCT/JP2019/037784.

\* cited by examiner

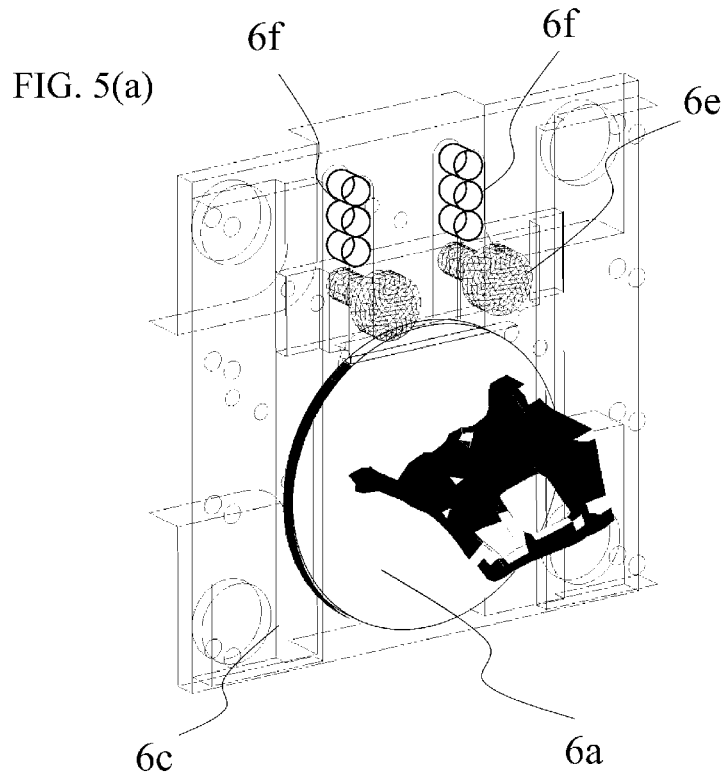
FIG. 5(a)
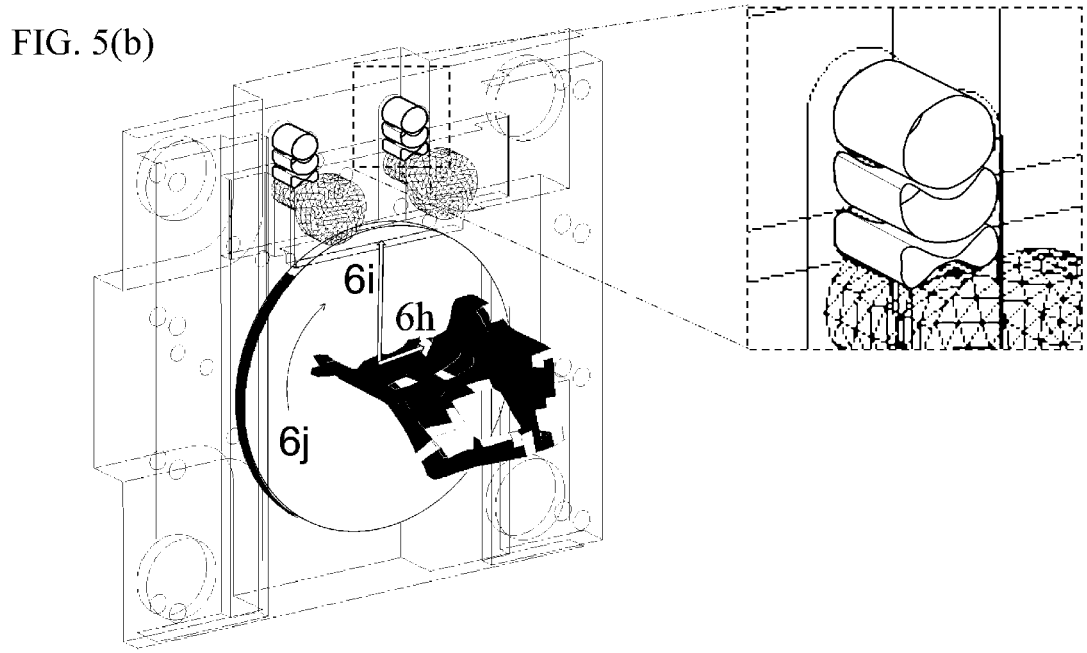
FIG. 5(b)
FIG. 5(c)

COLLISION PERFORMANCE EVALUATION TEST METHOD AND APPARATUS FOR AUTOMOBILE BODY PART

TECHNICAL FIELD

The present invention relates to a method and an apparatus for performing an evaluation test of collision performance of an automobile body part.

BACKGROUND ART

One of the performance capabilities required of an automobile body is collision performance, i.e., the automobile body is required to be capable of protecting an occupant while reducing damage to the automobile body in the event of a collision. In the development and design stage of automobiles, it is indispensable to perform an evaluation of such collision performance of automobile bodies, and performance prediction is carried out by computer simulation. Furthermore, as a means for confirming that desired collision performance has been achieved, auto manufacturers produce a set of prototypes to be used for collision tests, and in a case where the set of prototypes fails to satisfy the performance, it is required to take measures, produce a new set of prototypes, and carry out collision tests again, which requires enormous development cost and time.

In order, therefore, to save development cost and time, instead of a collision performance evaluation test for an entire automobile body, a collision performance evaluation test using an automobile body part alone (hereinafter referred to also as a "part collision test") has been conventionally performed. To evaluate collision performance of an entire automobile body by using the test for an automobile body part alone, it is desired to develop a test method for performing a test that is regarded as valid for actual deformation of an entire automobile body by controlling part restraint and load applied states.

Among body parts of an automobile, especially a part composed of front pillar and roof rail, which plays an important role in protecting an occupant in the event of a small overlap collision, are coupled to a front portion and a center pillar portion in an arch shape, and in the event of a collision with another automobile from a front direction, function to transmit a collision load generated in the center pillar portion when a front tire collides with the front portion to an automobile body rear portion while suppressing deformation as much as possible, thus suppressing intrusion thereof into an interior of the automobile to a minimum. At that time, the entire front portion is greatly crushed by the collision load of the tire, so that a load received by the roof rail part varies in a complicated manner during a collision process, and thus in a collision test for the roof rail part, it is required to reproduce deformation and a loaded state around the part to be tested.

Various studies and development have been made from the past on a part collision test capable of reproducing deformation and a loaded state around a part. For example, Patent Literature 1 proposes a collision performance evaluation test method for an automobile body part and a part collision test apparatus used in the method. In the evaluation test method and apparatus, a deformation resistance on an automobile body side is simulated by mounting a restraint jig formed by combining a flywheel with a one-way clutch to each support point on the automobile body part.

Furthermore, Patent Literature 2 proposes a part support jig capable of applying torque in a part collision test. The part support jig includes a rack-and-pinion gear and a spring in combination so as to be capable of restraining deformation of an automobile body part by using a force of the spring and adjusting a restraint state of the automobile body part by varying the tension of the spring.

CITATION LIST

Patent Literature

Patent Literature 1: International Publication No. WO 2011/016499
Patent Literature 2: JP-A-2016-061725

SUMMARY OF INVENTION

Technical Problem

It is desired that a collision performance test of an automobile part be carried out at a speed varying from a few to about 100 km per hour. It is, therefore, required that a jig used in a part collision test have such a structure and a level of strength as to be able to withstand such a varying speed. Furthermore, since the part collision test needs to be performed multiple times under various conditions, economic rationality is also considered to be important.

The technique proposed in Patent Literature 1, however, uses an inertial force of the flywheel to apply a restraint force to the automobile body part, which makes it difficult to perform the test in a low-speed region under a desired condition for obtaining the inertial force. Also in the test in a high-speed region, it is required to adjust the a mass of the flywheel in accordance with variations in speed, leading to a fear of an increase in cost of the test.

Furthermore, the technique proposed in Patent Literature 2 uses a rack-and-pinion and spring-type restraint mechanism to obtain a restraint force for the automobile body part and thus has a complex mechanism. This technique is therefore disadvantageous in that, in the test in a high-speed region exceeding 50 km per hour, an impacting load does not allow the mechanism to operate or even breaks an apparatus itself in the worst case.

In view of the above circumstances, an objective of the present invention is to propose a collision performance evaluation test method for an automobile part that advantageously solves the above-described problems of test speed limitations and economic rationality and to provide a collision performance evaluation test apparatus that is suitably used in the method.

Solution to Problem

A collision performance evaluation test method for an automobile body part of the present invention that achieves the above-described objective includes steps of, in performing an evaluation test of collision performance of an automobile body part,
supporting a front end portion, an intermediate portion, and a rear end portion of the automobile body part by using support jigs, respectively
providing a translation control and rotation control mechanism in the support jig for supporting the front end portion, and
providing a translation control mechanism in the support jig for supporting the intermediate portion.

The translation control and rotation control mechanism includes
- a pair of support members having two rows of horizontal guide grooves parallel to a collision direction,
- a rotary box that has an L-shaped plate including an upper surface to which the front end portion of the automobile body part is secured and a front surface with which a collision punch is made to collide and a side surface plate provided on each of both side surfaces of the L-shaped plate, and is held between the support members,
- a rotary shaft pin that penetrates, as a rotary shaft of the rotary box, the side surface plate of the rotary box and one of the two rows of horizontal guide grooves,
- a first compression pin that penetrates an arcuate guide groove formed about a center axis of the rotary shaft pin as an arc center and provided on the side surface plate of the rotary box and the other of the two rows of horizontal guide grooves, and
- a connection plate that connects the rotary shaft pin to the first compression pin so that the rotary shaft pin and the first compression pin are rotatable, and movable along the horizontal guide grooves. A first energy-absorbing member is disposed inside the arcuate guide groove.

The translation control mechanism includes
- a support plate that is secured to the support jig,
- a pair of slide guides that is provided on the support plate,
- a disk whose outer circumferential end portion is slidably held between the support plate and the slide guides and to which the intermediate portion of the automobile body part is secured, and
- a translation plate whose both end portions are slidably held between the support plate and the slide guides, respectively, and that is disposed to be in contact with an upper portion of the disk.

A second compression pin that is provided on one of the support plate and the translation plate so as to protrude toward the other of the support plate and the translation plate is fitted into a linear guide portion that is formed on the other of the support plate and the translation plate so as to extend in a direction in which the translation plate is slidable and includes a second energy-absorbing member disposed inside.

The collision punch is made to collide at a test speed with the front surface of the L-shaped plate of the rotary box, while a translation movement and a rotation of the front end portion of the automobile body part are controlled by using a horizontal movement of the rotary shaft pin and the first compression pin along the two rows of horizontal guide grooves of the translation control and rotation control mechanism and a reaction force against compression of the first energy-absorbing member by the first compression pin.

A translation movement of the intermediate portion of the automobile body part is controlled by using a reaction force against compression of the second energy-absorbing member by the second compression pin.

A collision performance evaluation test apparatus for an automobile body part of the present invention that achieves the above-described object is an apparatus that performs an evaluation test of collision performance of an automobile body part and includes
- support jigs for supporting a front end portion, an intermediate portion, and a rear end portion of the automobile body part, respectively,
- a translation control and rotation control mechanism that is provided in the support jig for supporting the front end portion,
- a translation control mechanism that is provided in the support jig for supporting the intermediate portion, and
- a collision punch that collides at a test speed with a front surface of an L-shaped plate included in the translation control and rotation control mechanism.

The translation control and rotation control mechanism includes
- a pair of support members having two rows of horizontal guide grooves parallel to a collision direction,
- a rotary box that has an L-shaped plate including an upper surface to which the front end portion of the automobile body part is secured and a front surface with which a collision punch is made to collide and a side surface plate provided on each of both side surfaces of the L-shaped plate, and is held between the support members,
- a rotary shaft pin that penetrates, as a rotary shaft of the rotary box, the side surface plate of the rotary box and one of the two rows of horizontal guide grooves,
- a first compression pin that penetrates an arcuate guide groove formed about a center axis of the rotary shaft pin as an arc center and provided on the side surface plate of the rotary box and the other of the two rows of horizontal guide grooves, and
- a connection plate that connects the rotary shaft pin to the first compression pin so that the rotary shaft pin and the first compression pin are rotatable, and movable along the horizontal guide grooves. A first energy-absorbing member is disposed inside the arcuate guide groove.

The translation control mechanism includes
- a support plate that is secured to the support jig,
- a pair of slide guides that are provided on the support plate,
- a disk whose outer circumferential end portion is slidably held between the support plate and the slide guides and that is used to secure the intermediate portion of the automobile body part thereto, and
- a translation plate whose both end portions are slidably held between the support plate and the slide guides, respectively, and that is disposed to be in contact with an upper portion of the disk.

A second compression pin that is provided on one of the support plate and the translation plate so as to protrude toward the other of the support plate and the translation plate is fitted into a linear guide portion that is formed on the other of the support plate and the translation plate so as to extend in a direction in which the translation plate is slidable and includes a second energy-absorbing member disposed inside.

The first compression pin provided in the translation control and rotation control mechanism is configured to deform the first energy-absorbing member by a rotation of the rotary box about the rotary shaft so as to apply torque opposite to a rotation direction of the rotary box to the rotary box, and
    the second compression pin provided in the translation control mechanism is configured to deform the second energy-absorbing member by a translation of the translation plate so as to apply a reaction force in an opposite direction to a translation direction of the translation plate to the translation plate.

Advantageous Effects of Invention

A collision performance evaluation test method for an automobile body part of the present invention includes steps of, in performing an evaluation test of collision performance of an automobile body part, supporting a front end portion, an intermediate portion, and a rear end portion of the automobile body part by using support jigs, respectively, providing a translation control and rotation control mechanism in the support jig for supporting the front end portion, and providing a translation control mechanism in the support jig for supporting the intermediate portion. The translation control and rotation control mechanism includes a pair of support members having two rows of horizontal guide grooves parallel to a collision direction, a rotary box that has an L-shaped plate including an upper surface to which the front end portion of the automobile body part is secured and a front surface with which a collision punch is made to collide and a side surface plate provided on each of both side surfaces of the L-shaped plate, and is held between the support members, a rotary shaft pin that penetrates, as a rotary shaft of the rotary box, the side surface plate of the rotary box and one of the two rows of horizontal guide grooves, a first compression pin that penetrates an arcuate guide groove formed about a center axis of the rotary shaft pin as an arc center and provided on the side surface plate of the rotary box and the other of the two rows of horizontal guide grooves, and a connection plate that connects the rotary shaft pin to the first compression pin so that the rotary shaft pin and the first compression pin are rotatable, and movable along the horizontal guide grooves. A first energy-absorbing member is disposed inside the arcuate guide groove. The translation control mechanism includes a support plate that is secured to the support jig, a pair of slide guides that is provided on the support plate, a disk whose outer circumferential end portion is slidably held between the support plate and the slide guides and to which the intermediate portion of the automobile body part is secured, and a translation plate whose both end portions are slidably held between the support plate and the slide guides, respectively, and that is disposed to be in contact with an upper portion of the disk. A second compression pin that is provided on one of the support plate and the translation plate so as to protrude toward the other of the support plate and the translation plate is fitted into a linear guide portion that is formed on the other of the support plate and the translation plate so as to extend in a direction in which the translation plate is slidable and includes a second energy-absorbing member disposed inside. The collision punch is made to collide at a test speed with the front surface of the L-shaped plate of the rotary box, while a translation movement and a rotation of the front end portion of the automobile body part are controlled by using a horizontal movement of the rotary shaft pin and the first compression pin along the two rows of horizontal guide grooves of the translation control and rotation control mechanism and a reaction force against compression of the first energy-absorbing member by the first compression pin. A translation movement of the intermediate portion of the automobile body part is controlled by using a reaction force against compression of the second energy-absorbing member by the second compression pin.

Consequently, according to the collision performance evaluation test method for an automobile body part of the present invention, when the collision punch is made to collide at a test speed with the rotary box to which the front end portion of the automobile body part is secured, with respect to a portion of the automobile body part supported by each support jig in which the translation control and rotation control mechanism or the translation control mechanism is provided, the reaction force in the opposite direction is applied from the translation control and rotation control mechanism or the translation control mechanism so as to control a translation or a rotation of that portion, and thus it is possible to implement a collision performance evaluation test using an automobile body part alone while successfully reproducing part restraint and load applied states at the time of an actual automobile body collision. Furthermore, a simple and robust structure in which the energy-absorbing members are disposed in the translation control and rotation control mechanism and the translation control mechanism of the support jigs enables a test in a high-speed region of not less than 50 km per hour, and the energy-absorbing members are formed of a less costly member, so that economic rationality of the test can also be enhanced.

Furthermore, a collision performance evaluation test apparatus for an automobile body part of the present invention includes support jigs for supporting a front end portion, an intermediate portion, and a rear end portion of the automobile body part, respectively, a translation control and rotation control mechanism that is provided in the support jig for supporting the front end portion, a translation control mechanism that is provided in the support jig for supporting the intermediate portion, and a collision punch that collides at a test speed with a front surface of an L-shaped plate included in the translation control and rotation control mechanism. The translation control and rotation control mechanism includes a pair of support members having two rows of horizontal guide grooves parallel to a collision direction, a rotary box that has an L-shaped plate including an upper surface to which the front end portion of the automobile body part is secured and a front surface with which a collision punch is made to collide and a side surface plate provided on each of both side surfaces of the L-shaped plate, and is held between the support members, a rotary shaft pin that penetrates, as a rotary shaft of the rotary box, the side surface plate of the rotary box and one of the two rows of horizontal guide grooves, a first compression pin that penetrates an arcuate guide groove formed about a center axis of the rotary shaft pin as an arc center and provided on the side surface plate of the rotary box and the other of the two rows of horizontal guide grooves, and a connection plate that connects the rotary shaft pin to the first compression pin so that the rotary shaft pin and the first compression pin are rotatable, and movable along the horizontal guide grooves. A first energy-absorbing member is disposed inside the arcuate guide groove. The translation control mechanism includes a support plate that is secured to the support jig, a pair of slide guides that are provided on the support plate, a disk whose outer circumferential end portion is slidably held between the support plate and the slide guides and that is used to secure the intermediate portion of the automobile body part thereto, and a translation plate whose both end portions are slidably held between the support plate and the slide guides, respectively, and that is disposed to be in contact with an upper portion of the disk. A second compression pin that is provided on one of the support plate and the translation plate so as to protrude toward the other of the support plate and the translation plate is fitted into a linear guide portion that is formed on the other of the support plate and the translation plate so as to extend in a direction in which the translation plate is slidable and includes a second energy-absorbing member disposed inside. The first compression pin provided in the translation control and rotation control mechanism is configured to deform the first energy-absorbing member by a rotation of the rotary box about the rotary shaft so as to apply torque opposite to a rotation direction of the rotary box to the rotary box, and the second compression pin provided in the translation control mechanism is configured to deform the second energy-absorbing member by a translation of the translation plate so as to apply a reaction force in an opposite direction to a translation direction of the translation plate to the translation plate.

Consequently, according to the collision performance evaluation test apparatus for an automobile body part of the present invention, when the collision punch is made to collide at a test speed with the rotary box to which the front end portion of the automobile body part is secured, with respect to a portion of the automobile body part supported by each support jig in which the translation control and rotation control mechanism or the translation control mechanism is provided, the reaction force in the opposite direction is applied from the translation control and rotation control mechanism or the translation control mechanism so as to control a translation or a rotation of that portion, and thus it is possible to implement a collision performance evaluation test using an automobile body part alone while successfully reproducing part restraint and load applied states at the time of an actual automobile body collision. Furthermore, a simple and robust structure in which the energy-absorbing members are disposed in the translation control and rotation control mechanism and the translation control mechanism of the support jigs enables a test in a high-speed region of not less than 50 km per hour, and the energy-absorbing members are formed of a less costly member, so that economic rationality of the test can also be enhanced.

In the collision performance evaluation test method and apparatus for an automobile body part of the present invention, it is preferable that the automobile body part is constituted of a front pillar and a roof rail of an automobile, as the automobile front pillar and the roof rail parts are largely influenced by part restraint states and load applied states during a part collision test. Furthermore, it is preferable that the translation control and rotation control mechanism and the translation control mechanism reproduce a state of deformation of the automobile body part generated due to an actual automobile body collision. This can increase accuracy in evaluating collision performance of an automobile body part and thus is preferable.

Moreover, in the collision performance evaluation test method and apparatus for an automobile body part of the present invention, it is preferable that the support jigs for supporting the intermediate portion and the rear end portion of the automobile body part individually have load cells for load measurement, and the load cells are used to measure a distribution of a deformation load generated at the time of collision deformation of the automobile body part caused by the collision punch. This is preferable in that a load applied from the automobile body part to any other portion of an automobile body at the time of collision deformation of the automobile body part can also be obtained. Furthermore, it is preferable that the energy-absorbing members are formed of a commercially available metallic cylindrical pipe. This is preferable in that a commercially available metallic cylindrical pipe is inexpensively available and has stable energy-absorbing capability.

BRIEF DESCRIPTION OF DRAWINGS

FIG. 3 shows perspective views illustrating a function of a translation control and rotation control mechanism in the above-described embodiment, in which

FIG. 5 shows perspective views illustrating a function of a translation control mechanism in the above-described embodiment, in which FIG. 5(a) is a schematic view showing a state before a collision test, FIG. 5(b) is a schematic view showing a state after the collision test, and FIG. 5(c) is a schematic view showing, on an enlarged scale, how the energy-absorbing member is deformed after the collision test.

FIG. 7 shows side views of the automobile body part illustrating a result of the above-described collision test, in which

FIG. 8 is graphs showing variations in load of load cells installed at a rear end portion of a roof rail measured in the above-described collision test, in which

FIG. 9 shows views illustrating a result of an actual automobile collision test for an automobile, in which

DESCRIPTION OF EMBODIMENT

Figure 1:
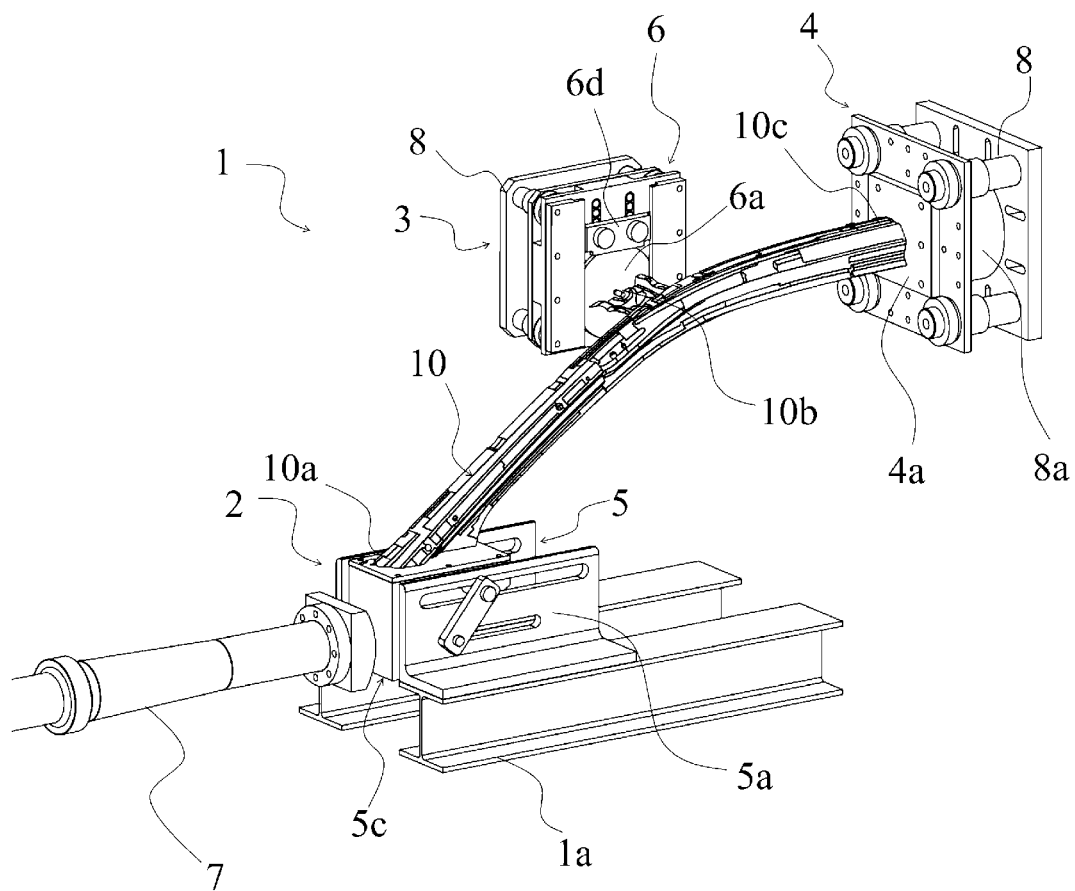
FIG. 1 is a perspective view schematically showing a collision performance evaluation test apparatus for an automobile boy part according to an embodiment of the present invention used in a collision performance evaluation test method for an automobile body part according to an embodiment of the present invention.
Figure 2:
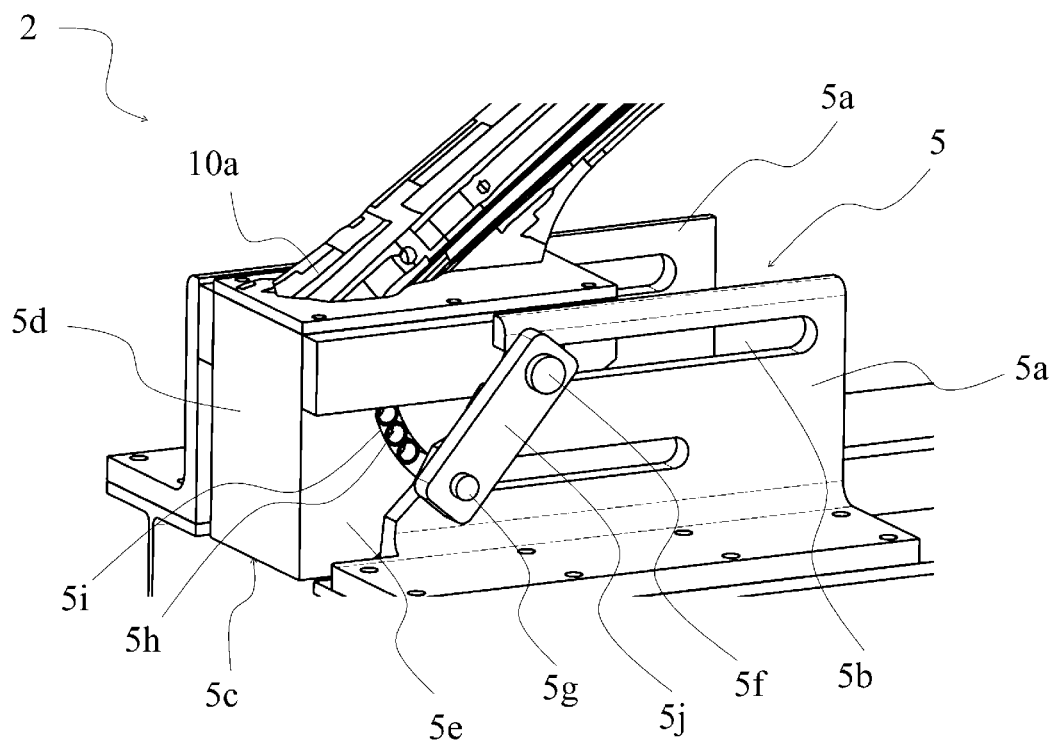
FIG. 2 is a perspective view showing a support jig for supporting a front end portion of a front pillar as an automobile body part in the collision performance evaluation test apparatus for an automobile body part according to the above-described embodiment.
Figure 4:
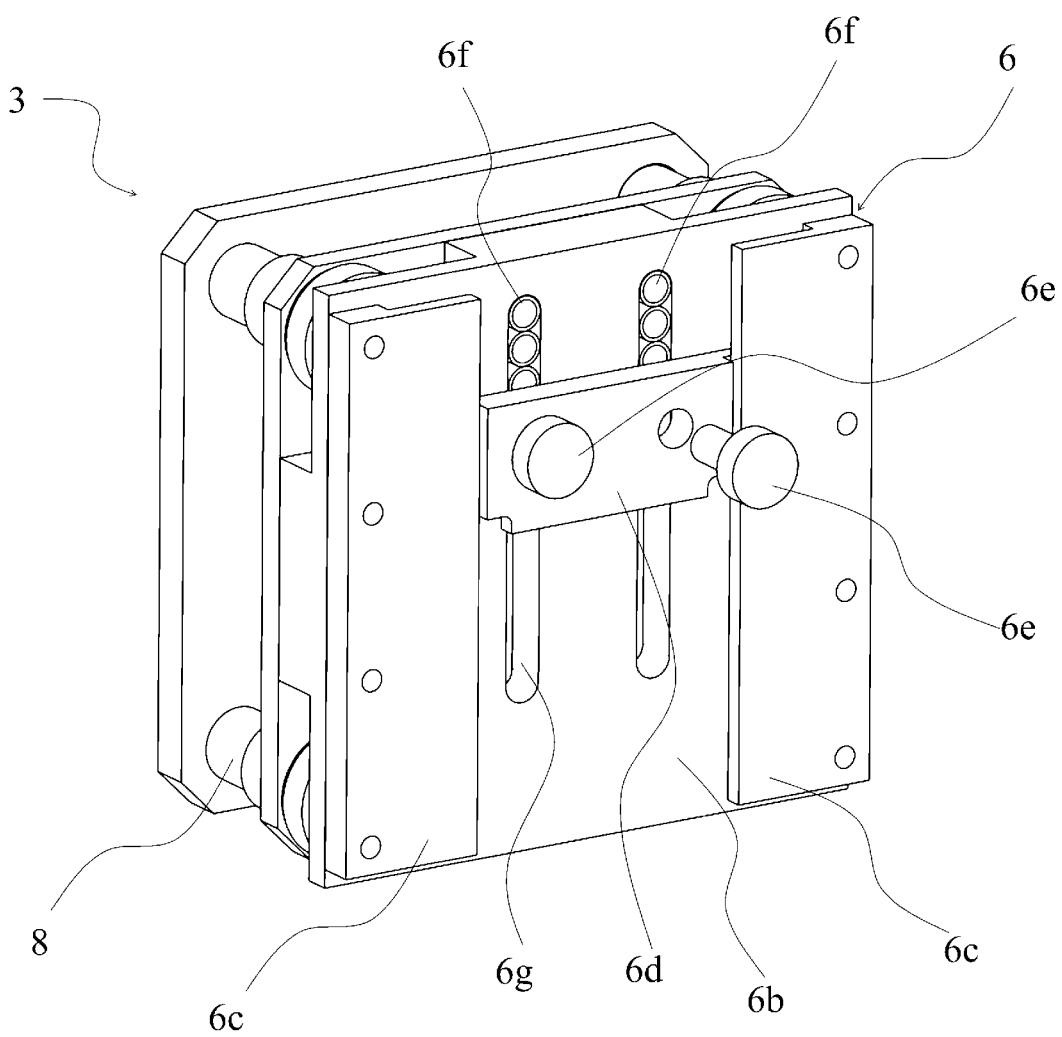
FIG. 4 is a perspective view showing a support jig for supporting a roof side as an intermediate portion of the automobile body part in the collision performance evaluation test apparatus for an automobile body part according to the above-described embodiment.

With reference to the appended drawings, the following describes in detail an embodiment of the present invention. Here, FIG. 1 is a perspective view schematically showing a collision performance evaluation test apparatus for an automobile body part according to an embodiment of the present invention used in a collision performance evaluation test method for an automobile body part according to an embodiment of the present invention. FIGS. 2 and 4 are enlarged perspective views showing support jigs for supporting a front end portion of a front pillar as an automobile body part and a roof side as an intermediate portion of the automobile body part, respectively, in the collision performance evaluation test apparatus for an automobile body part according to the above-described embodiment.

A collision performance evaluation test apparatus 1 for an automobile body part according to this embodiment performs a test for evaluating head-on collision performance of a part 10 that is composed of an automobile front pillar and a roof rail as automobile body parts and includes, as shown in FIG. 1, a front portion support jig 2 for supporting a front end portion 10a of the front pillar that is a front end portion of the part 10 composed of the front pillar and the roof rail, a roof side support jig 3 for supporting a roof side 10b as an intermediate portion of the part 10 composed of the front pillar and the roof rail, a roof rail rear end portion support jig 4 for supporting a rear end portion 10c of the roof rail that is a rear end portion of the part 10 composed of the front pillar and the roof rail, a translation control and rotation control mechanism 5 that is provided in the front portion support jig 2, a translation control mechanism 6 that is provided in the roof side support jig 3, and a collision punch 7 that horizontally collides at a test speed toward a front surface of an L-shaped plate 5d included in the translation control and rotation control mechanism 5.

FIG. 2 is a partially cut-out perspective view showing, on an enlarged scale, the translation control and rotation control mechanism 5 in the front portion support jig 2. The translation control and rotation control mechanism 5 includes a pair of left and right front portion support members 5a that is secured to a structure 1a of the apparatus, each of the front portion support members 5a having two rows of horizontal guide grooves 5b parallel to a collision direction, a rotary box 5c that is held between the front portion support members 5a, has an L-shaped plate 5d including an upper surface to which the front end portion 10a is secured and a front surface with which a collision punch is made to collide and a side surface plate 5e provided on each of both side surfaces of the L-shaped plate 5d, a rotary shaft pin 5f that penetrates, as a rotary shaft of the rotary box 5c, the side surface plate 5e of the rotary box 5c and one of the two rows of horizontal guide grooves 5b, a first compression pin 5g that penetrates an arcuate guide groove 5i formed about the rotary shaft pin 5f as an arc center and provided on the side surface plate 5e of the rotary box 5c and the other of the two rows of horizontal guide grooves 5b, and a connection plate 5j that is used to separate the rotary shaft pin 5f from the first compression pin 5g by a distance of a radius of the arcuate guide groove 5i and to connect the rotary shaft pin 5f to the first compression pin 5g so that they are individually rotatable and movable along the horizontal guide grooves 5b. In this embodiment, as a first energy-absorbing member, a plurality of cylindrical metal pipes 5h such as short steel pipes are slidably fitted inside the arcuate guide groove 5i between one end of the arcuate guide groove 5i and the compression pin 5g.

Figure 3A:
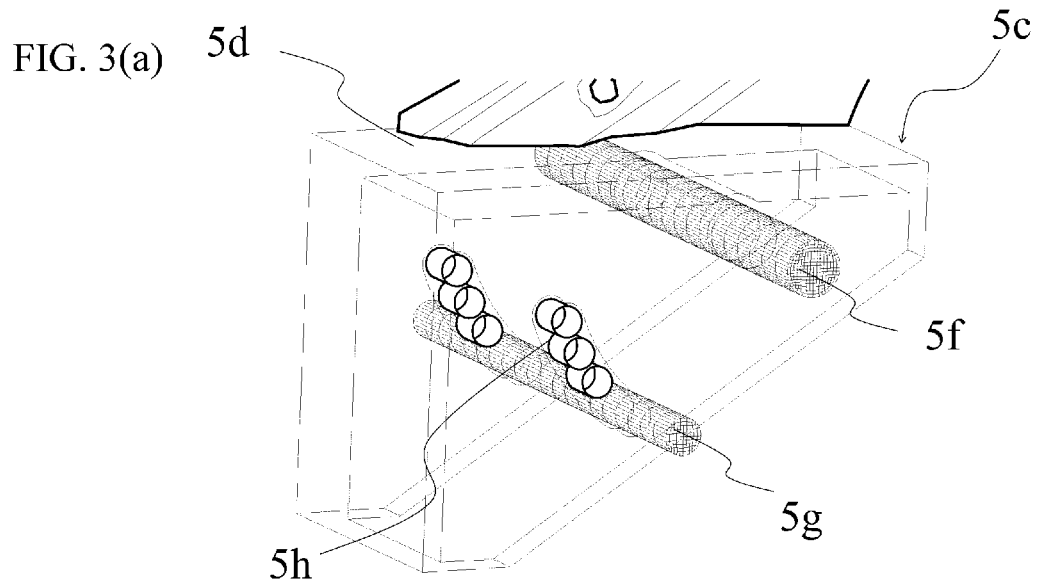
FIG. 3(a) is a schematic view showing a state before a collision test.
Figure 3B:
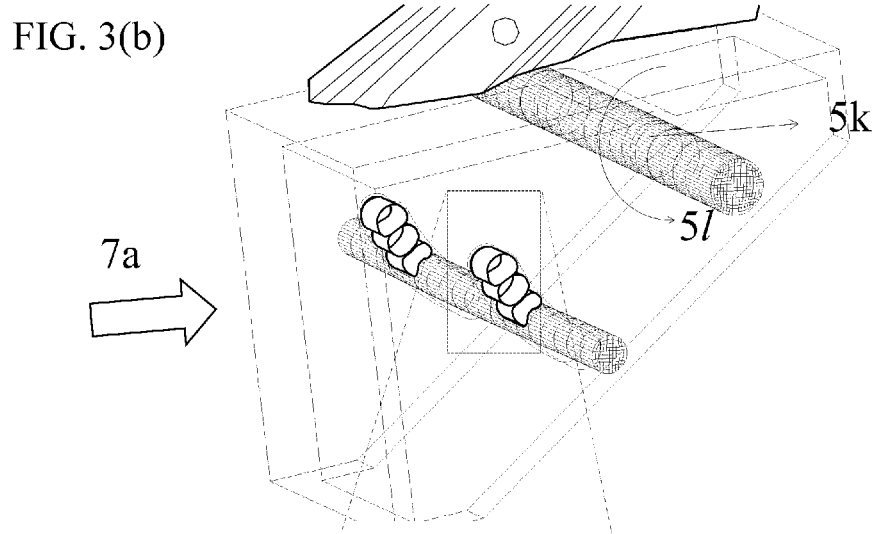
FIG. 3(b) is a schematic view showing a state after the collision test.
Figure 3C:
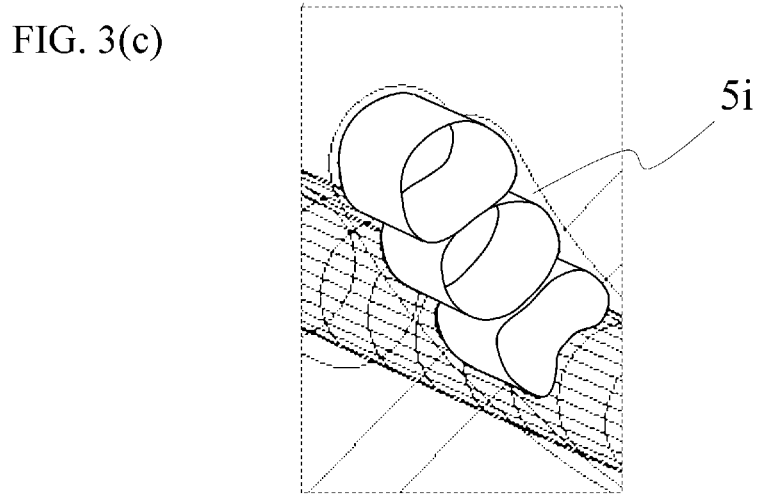
FIG. 3(c) is a schematic view showing, on an enlarged scale, how an energy-absorbing member is deformed after the collision test.

FIG. 3 shows perspective views schematically illustrating a function of the translation control and rotation control mechanism 5. FIG. 3(a) shows a state of the translation control and rotation control mechanism 5 before a collision test, schematically and transparently illustrating how the L-shaped plate 5d of the rotary box 5c, the rotary shaft pin 5f, the compression pin 5g, and the metal pipes 5h are arranged in the translation control and rotation control mechanism 5. FIG. 3(b) shows a state of the translation control and rotation control mechanism 5 after the collision test, in which the rotary shaft pin 5f and the compression pin 5g move in a horizontal translation direction 5k parallel to a collision direction 7a, and the rotary box 5c rotates about the rotary shaft pin 5f as the rotary shaft toward a rotation direction 5l. At this time, since the first compression pin 5g is restrained from moving to the rotation direction 5l by the horizontal guide grooves 5b of the support members 5a and the connection plate 5j, as shown in FIG. 3(c) on an enlarged scale, the metal pipes 5h (three metal pipes 5h in this example) inside the arcuate guide groove 5i are compressed to be deformed by a terminal end of the arcuate guide groove 5i and the first compression pin 5g. A reaction force against the metal pipe deformation applies torque in an opposite direction to the rotation of the rotary box 5c. It is, therefore, possible to control a translation movement and a rotation of the front pillar front end portion 10a secured to the rotary box 5c. In this way, even in a collision test using an automobile body part alone, it is possible to perform a test that is regarded as valid for an actual automobile in consideration of influences of peripheral members.

FIG. 4 is a perspective view showing, on an enlarged scale, the translation control mechanism 6 of the support jig 3 for supporting the roof side 10b as the intermediate portion of the automobile body part. The translation control mechanism 6 includes a support plate 6b that is secured to the support jig 3 and, in this embodiment, has two parallel columns of linear perpendicular guide grooves 6g, a pair of slide guides 6c that is mounted on the support plate 6b so that the slide guides 6c are opposed to each other with a space interposed therebetween, a disk 6a (see FIG. 1) whose outer circumferential end portion is slidably held in a gap between the support plate 6b and the slide guides 6c and to which the roof side 10b is secured, a translation plate 6d whose both end portions are slidably held in gaps between the support plate 6b and the slide guides 6c, respectively, and that is disposed to be in contact with an upper portion of the securing disk 6a, and two second compression pins 6e that, in this embodiment, penetrate the translation plate 6d and whose front ends penetrate the two columns of perpendicular guide grooves 6g, respectively. In this embodiment, as a second energy-absorbing member, a plurality of cylindrical metal pipes 6f such as short steel pipes are slidably fitted inside the perpendicular guide grooves 6g between upper ends of the perpendicular guide grooves 6g and the second compression pins 6e. Furthermore, in this embodiment, a load cell 8a (not shown) is disposed between the support plate 6b and the structure 1a (not shown) via a load cell box 8 and is used to measure a load in a direction perpendicular to the support plate 6a. Thus, it is possible to measure a deformation force of the automobile body part acting in a direction perpendicular to a vertical plane including the collision direction 7a. A configuration may also be adopted in which the linear guide grooves 6g are arranged on the translation plate 6d, and the second compression pins 6e are placed on the support plate 6b so as to be fitted into the guide grooves 6g. Furthermore, while this embodiment uses the two columns of linear perpendicular guide grooves, it presents no problem to use a single linear perpendicular guide groove or three or more linear perpendicular guide grooves. Moreover, the respective numbers of the metal pipes 5h and 6f to be disposed in each guide groove can be freely selected.

FIG. 5 is perspective views schematically showing a function of the translation control mechanism 6 in the above-described embodiment. FIG. 5(a) shows a state of the translation control mechanism 6 before a collision test, transparently illustrating how the disk 6a to which the roof side 10b is secured, the compression pins 6e, and the metal pipes 6f are arranged. FIG. 5(b) is a view transparently showing a state of the translation control mechanism 6 after the collision test. Due to deformation of the automobile body part caused by a collision, the roof side that is the intermediate portion of the automobile body part moves in a perpendicular translation direction 6i and slightly in a horizontal translation direction 6h and rotates in a rotation direction 6j. Among these movements and rotation, the movement in the perpendicular translation direction 6i causes the disk 6a to move to that direction, so that the translation plate 6d and the compression pins 6e are pushed perpendicularly upward. At this time, as shown in FIG. 5(c) on an enlarged scale, the metal pipes 6f (three metal pipes 6f in this example) in each of the perpendicular guide grooves 6g are compressed to be deformed by an upper end of the each of the perpendicular guide grooves 6g and a corresponding one of the compression pins 6e. A reaction force against the metal pipe deformation acts on the securing disk 6a via the translation plate and thus applies a reaction force to the automobile body part. In this way, even in a collision test using an automobile body part alone, it is possible to perform a test that is regarded as valid for an actual automobile in consideration of influences of peripheral members.

In the embodiment shown in FIG. 1, the roof rail rear end portion support jig 4 has a securing plate 4a to which the roof rail rear end portion 10c is secured. The load cell 8a is disposed between the securing plate 4a and the structure 1a (not shown) via the load cell box 8 and is used to measure a load in a perpendicular-to-plane direction of the securing plate, namely, the collision direction 7a.

Metal pipes used as the energy-absorbing members are made by cutting a commercially available steel pipe, and while they need to be replaced every time a test is performed, a cost required for the test can be kept low.

While the foregoing descriptions have been made with reference to the illustrated examples, the present invention is not limited to the above-described examples. For example, while the above-described embodiment uses the metal pipes 5h and 6f as the energy-absorbing members, it is also possible to use members having other shapes or made of other materials in place thereof or in addition thereto. Furthermore, as for the support jig for supporting an intermediate portion of an automobile body part, after a deformation direction of the automobile body part is grasped by a previously conducted CAE analysis or the like, it is possible to change a translation direction of the translation control mechanism as appropriate or to use a plurality of intermediate portion support jigs. Furthermore, an automobile body part is also not limited to a part composed of a front pillar and a roof rail, and the present invention is applicable to a collision test with respect to a load from a direction approximately parallel to an axis of any other type of automobile body part.

EXAMPLE

Figure 6:
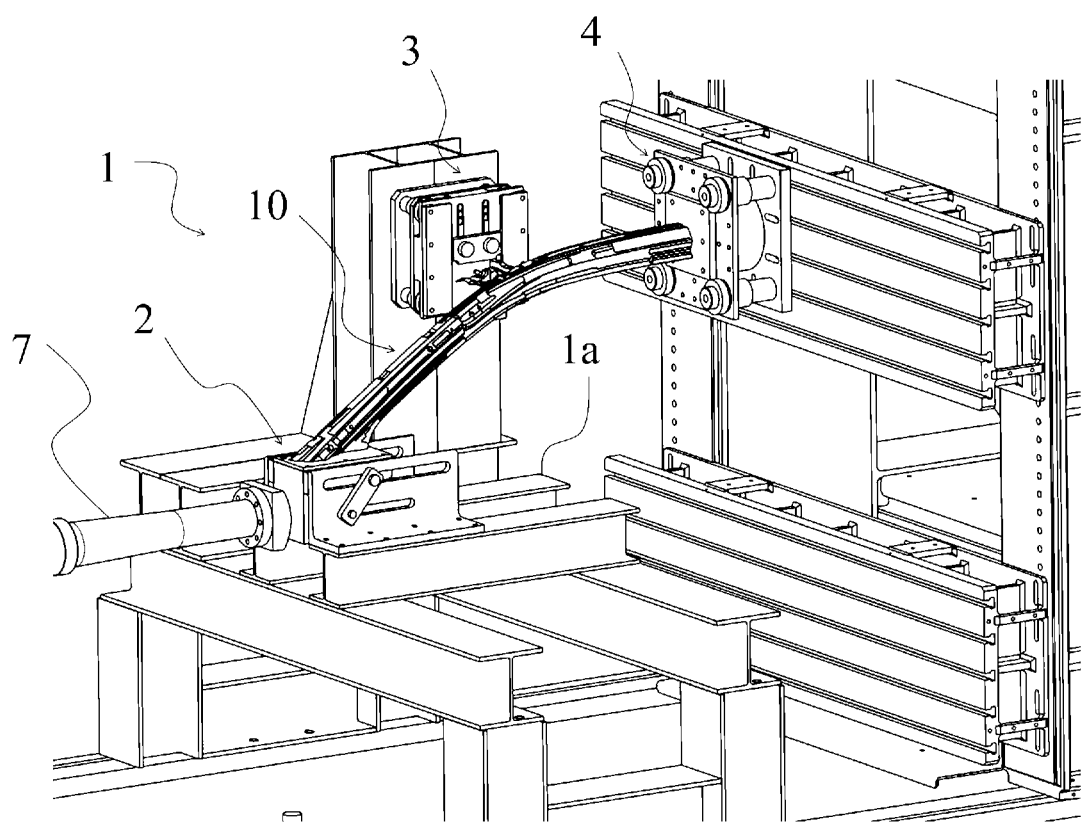
FIG. 6 is a perspective view schematically showing a configuration of a collision test for an automobile body part used in an example.
Figure 7A:
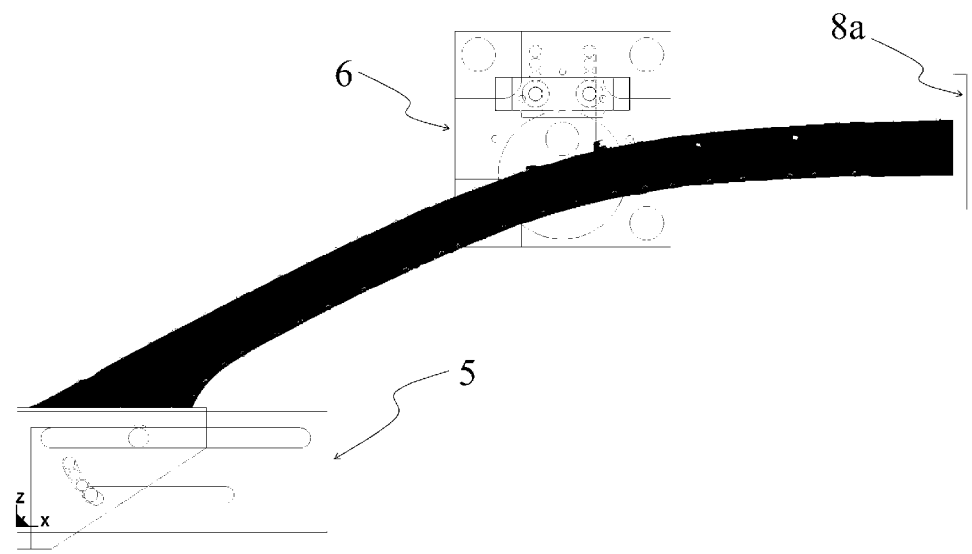
FIG. 7(a) shows a shape of the automobile body part before the collision test and FIG. 7(b) shows a shape of the automobile body part after the collision test.
Figure 7B:
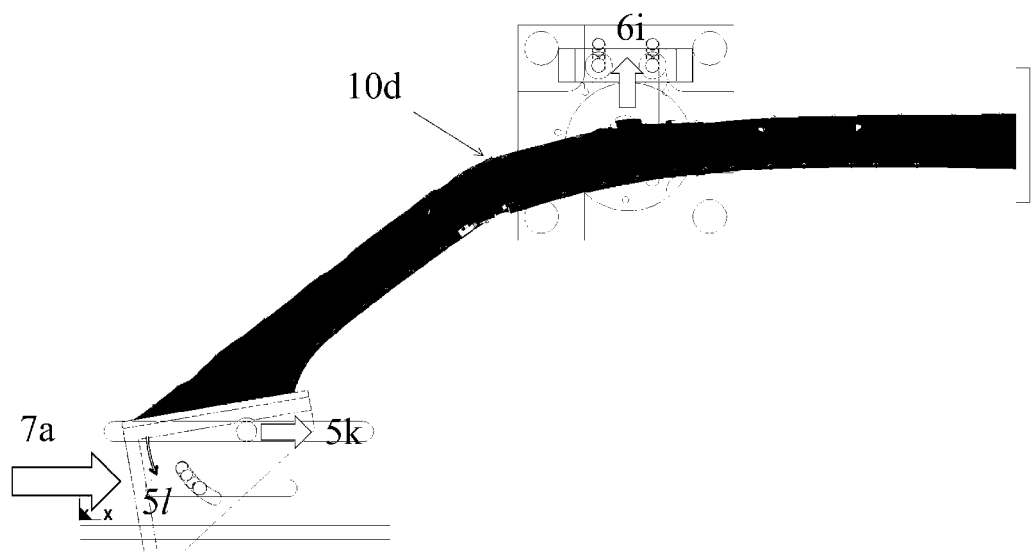

FIG. 6 shows an example of the present invention. In a collision performance evaluation test method for an automobile body part of this example, the above-described collision performance evaluation test apparatus for an automobile body part was used to carry out a part collision test for a part 10 composed of an automobile front pillar and an automobile roof rail by simulating a head-on collision of an automobile. In the test, a front end portion 10a of the front pillar was supported by a front support jig 2, a roof side 10b was supported by a roof side support jig 3, a roof rail rear end portion 10c was supported by a rear end portion support jig 4, a collision punch 7 was made to collide with a front surface (perpendicular surface) of an L-shaped plate 5d having an upper surface (horizontal surface) to which the front end portion 10a of the front pillar was secured at a test speed horizontally and perpendicularly to a plane of the front surface, and a load distribution generated at the time of the collision was measured by measuring, with load cells 8a, a side surface load applied to the roof side support jig 3 and a horizontal load applied to the roof rail rear end portion support jig 4, respectively. Moreover, as shown in FIGS. 7(a) and 7(b), changes in shape of the part 10 composed of the front pillar and the roof rail before and after the collision is measured.

In this part collision test, a state of a head-on collision that can actually occur is simulated, and a rotation and a movement in up-down and left-right directions of the front pillar front end portion 10a are restrained by using a translation control and rotation control mechanism 5. A roof rail portion, on the other hand, may be deformed to be displaced in the up-down direction of an automobile body at the time of the head-on collision, and thus a movement in the up-down direction of the roof rail portion as well as a rotation thereof is restrained by using a translation control mechanism 6. A restraint force generated in the roof side 10b is predicted previously by a CAE (computer-aided engineering) analysis, and the thickness and the number of steel pipes 6f are determined so that a reaction force equivalent to the restraint force is generated, while torque generated in the front pillar front end portion 10a is predicted, and the thickness and the number of steel pipes 5h are determined so that torque equivalent to the torque is generated.

In this example, a total of twelve cylindrical steel pipes 5h and 6f having a thickness of 1.2 mm, a diameter of 16 mm, and a length of 20 mm were disposed, with three such cylindrical pipes 5h disposed in each of arcuate guide grooves 5i of the translation control and rotation control mechanism 5 and three such cylindrical pipes 6f disposed in each of perpendicular guide grooves of the translation control mechanism 6. Furthermore, a shape and a collision position of the collision punch 7 were determined by simulating a cart used in an automobile body collision test for an actual automobile.

In the part collision test of this example, using a high-speed hydraulic servo deformation tester, the collision punch 7 is made to collide at a speed of 40 km per hour with the perpendicular surface of the L-shaped plate 5d included in a rotary box 5c of the translational control and rotation control mechanism 5. As a result, as shown in FIG. 7(b), it is seen that the automobile body part 10 is bent, with a deformed portion 10d generated at a position on the roof rail nearer to the front than the roof side.

Figure 8A:
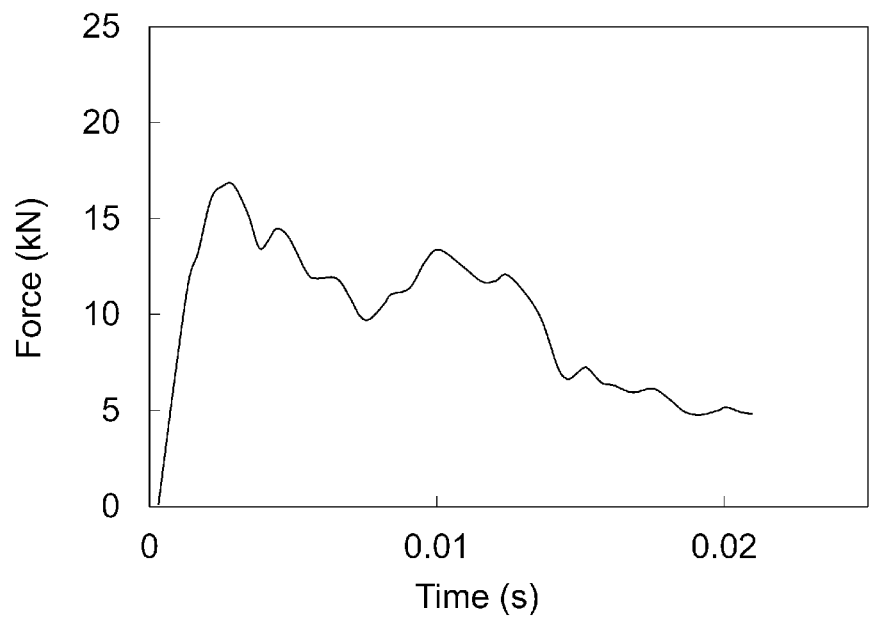
FIG. 8(a) shows variations in load of the load cell installed in a support jig for supporting a rear end portion of the automobile body part and FIG. 8(b) shows variations in load of the load cell installed in a support jig for supporting the intermediate portion of the automobile body part.
Figure 8B:
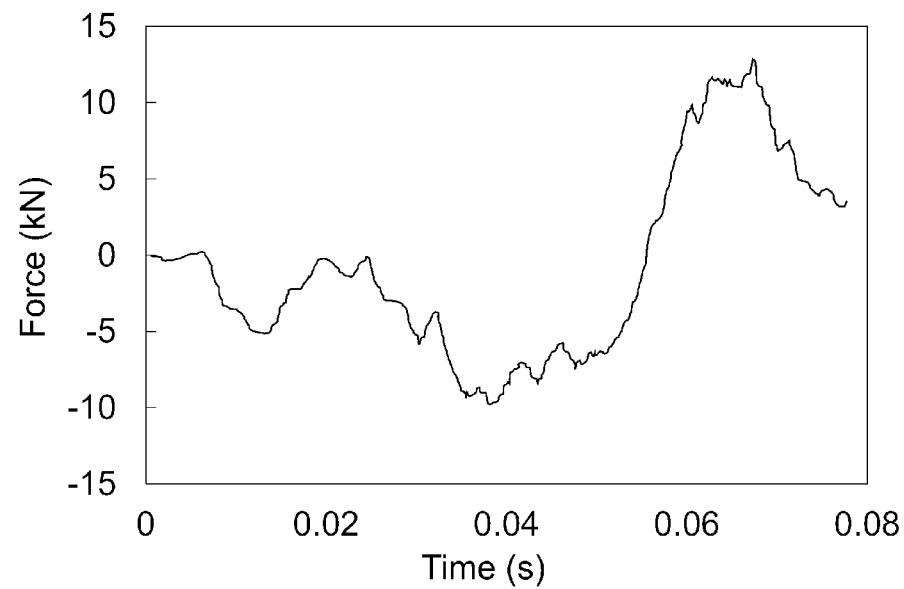

FIG. 8 is graphs showing variations in load over time during the part collision test in the collision performance evaluation test method for an automobile body part of this example, in which FIG. 8(a) is a graph showing variations in collision load over time transmitted to the automobile body part in a collision direction 7a of the collision punch 7, which were measured by using the load cell 8a in the roof rail rear end support jig 4, and FIG. 8(b) shows variations in deformation load over time acting in a direction perpendicular to a vertical plane including the collision direction 7a when the automobile body part is deformed. A horizontal axis indicates an elapsed time (s) from the time of a collision, and a vertical axis indicates a magnitude (kN) of a load. As shown in FIGS. 8(a) and 8(b), there could be obtained variations in collision load over time based on deformation of the automobile body part after the collision.

Figure 9A:
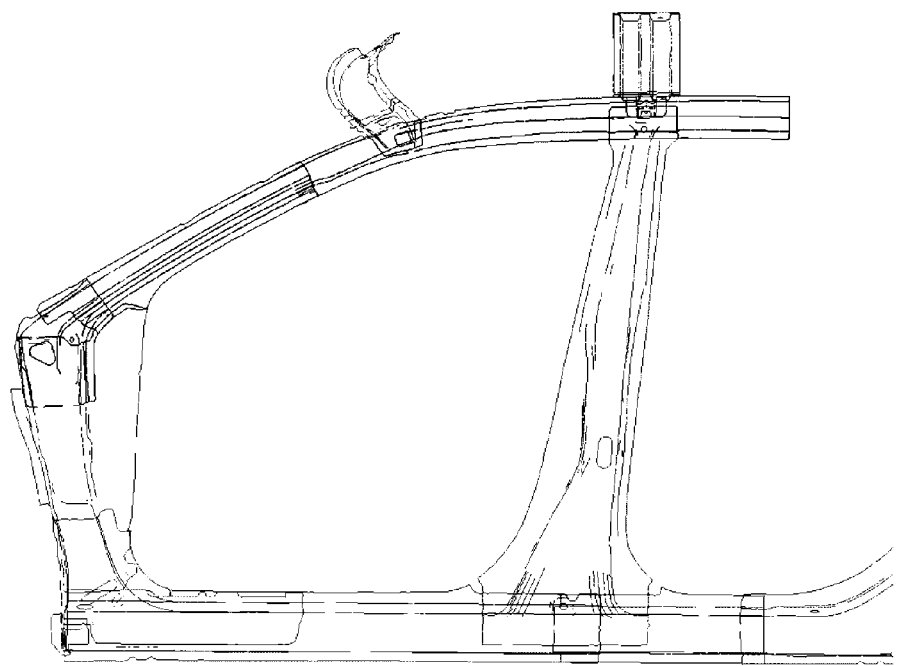
FIG. 9(a) is a side view schematically showing a shape of an automobile body part before the collision test and FIG. 9(b) is a side view schematically showing a shape of the automobile body part after the collision test.
Figure 9B:
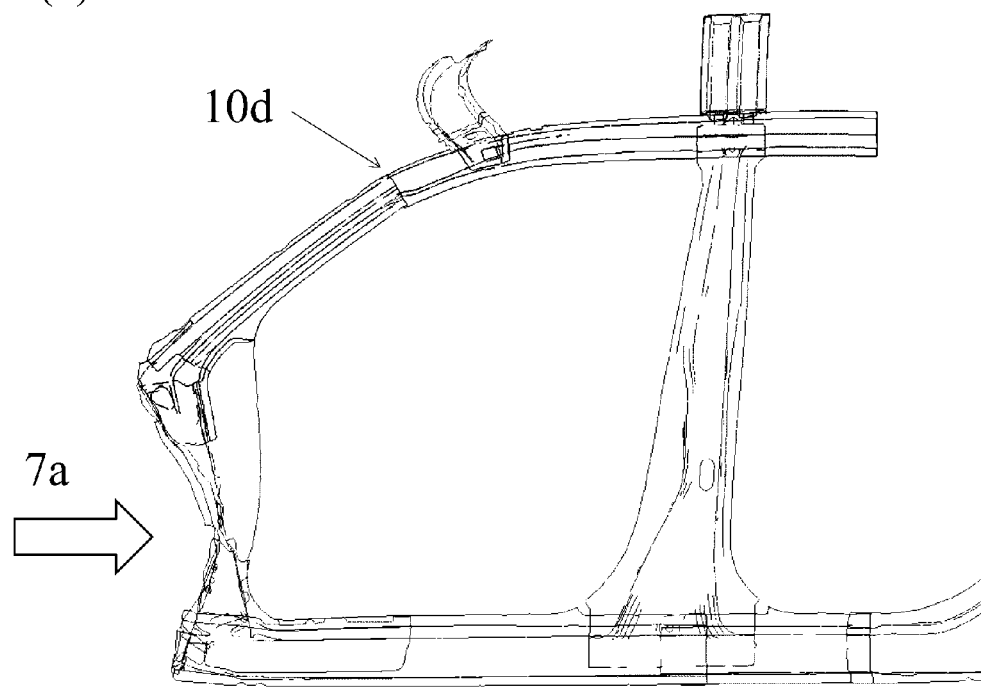

FIG. 9 shows schematic side views illustrating a state of deformation of an automobile body part during a small overlap test as an actual automobile collision test. FIG. 9(a) shows the automobile body part (a front pillar and a roof rail) before the collision test, and FIG. 9(b) shows how the automobile body part has been deformed after the collision test. In comparison between FIG. 7 and FIG. 9, the deformed portion 10d of the automobile body part is generated in substantially an identical location, and thus it can be understood that the collision performance evaluation test method and the collision performance evaluation test apparatus for an automobile body part according to the present invention are capable of reproducing deformation generated due to a head-on collision of an actual automobile.

INDUSTRIAL APPLICABILITY

As thus described, according to the collision performance evaluation test method and apparatus for an automobile body part of the present invention, when the collision punch is made to collide at a test speed with the automobile body part, with respect to any portion of the automobile body part supported by a corresponding one of the support jigs in which the translation control and rotation control mechanism or the translation control mechanism is provided, a reaction force or torque in the opposite direction is applied from the translation control and rotation control mechanism or the translation control mechanism so as to control a translation or a rotation of that portion, and thus it is possible to implement a collision performance evaluation test using an automobile body part alone while successfully reproducing part restraint and load applied states at the time of an actual automobile body collision. Furthermore, a simple and robust structure in which the energy-absorbing members are disposed respectively in the translation control and rotation control mechanism and the translation control mechanism of the support jigs enables a test in a high-speed region of not less than 50 km per hour, and the energy-absorbing members are formed of a less costly member, so that economic rationality of the test can also be enhanced.

REFERENCE SIGNS LIST 1 collision performance test apparatus
1a structure
10 test subject (part composed of front pillar and roof rail)
10a front pillar front end portion
10b roof side intermediate portion
10c roof rail rear end portion
10d deformed portion
2 front pillar front end portion support jig
3 roof side intermediate portion support jig
4 roof rail rear end portion support jig
4a roof rail rear end portion securing plate
5 translation control and rotation control mechanism
5a support member
5b horizontal guide groove
5c rotary box
5d rotary box L-shaped plate
5e rotary box side surface plate
5f rotary shaft pin
5g first compression pin
5h first energy-absorbing member (metal pipe)
5i arcuate guide groove
5j pin connection plate
5k horizontal translation direction
5l rotation direction
6 translation control mechanism
6a roof side intermediate portion securing disk
6b support plate (slide base)
6c slide guide
6d translation plate
6e second compression pin
6f second energy-absorbing member (metal pipe)
6g perpendicular guide groove
6h horizontal translation direction
6i perpendicular translation direction
6j rotation direction
7 collision punch
7a collision direction
8 load cell box
8a load cell

The invention claimed is:

1. A collision performance evaluation test method for an automobile body part,
wherein
the method comprises steps of:
in performing an evaluation test of collision performance of an automobile body part,
supporting a front end portion, an intermediate portion, and a rear end portion of the automobile body part by using support jigs, respectively;
providing a translation control and rotation control mechanism in the support jig for supporting the front end portion; and
providing a translation control mechanism in the support jig for supporting the intermediate portion,
wherein
the translation control and rotation control mechanism includes:
a pair of support members having two rows of horizontal guide grooves parallel to a collision direction;
a rotary box that has an upper surface to which the front end portion of the automobile body part is secured, includes an L-shaped plate having a front surface with which a collision punch is made to collide and a side surface plate provided on each of both side surfaces of the L-shaped plate, and is held between the support members;
a rotary shaft pin that penetrates, as a rotary shaft of the rotary box, the side surface plate of the rotary box and one of the two rows of horizontal guide grooves;
a first compression pin that penetrates an arcuate guide groove formed about a center axis of the rotary shaft pin as an arc center and provided on the side surface plate of the rotary box and another of the two rows of horizontal guide grooves; and
a connection plate that connects the rotary shaft pin to the first compression pin so that the rotary shaft pin and the first compression pin are rotatable, and movable along the horizontal guide grooves, a first energy-absorbing member is disposed inside the arcuate guide groove,
the translation control mechanism includes:
a support plate that is secured to the support jig;
a pair of slide guides that is provided on the support plate;
a disk whose outer circumferential end portion is slidably held between the support plate and the slide guides and to which the intermediate portion of the automobile body part is secured; and
a translation plate whose both end portions are slidably held between the support plate and the slide guides, respectively, and that is disposed to be in contact with an upper portion of the disk,
a second compression pin that is provided on one of the support plate and the translation plate so as to protrude toward another of the support plate and the translation plate is fitted into a linear guide portion that is formed on the other of the support plate and the translation plate so as to extend in a direction in which the translation plate is slidable and includes a second energy-absorbing member disposed inside,
the collision punch is made to collide at a test speed with the front surface of the L-shaped plate of the rotary box, while a translation movement and a rotation of the front end portion of the automobile body part are controlled by using a horizontal movement of the rotary shaft pin and the first compression pin along the two rows of horizontal guide grooves of the translation control and rotation control mechanism and a reaction force against compression of the first energy-absorbing member by the first compression pin, and
a translation movement of the intermediate portion of the automobile body part is controlled by using a reaction force against compression of the second energy-absorbing member by the second compression pin.

2. The collision performance evaluation test method for an automobile body part according to claim 1, wherein the automobile body part is a part composed of a front pillar and a roof rail.

3. The collision performance evaluation test method for an automobile body part according to claim 2, wherein the translation control and rotation control mechanism and the translation control mechanism reproduce a state of deformation of the automobile body part generated due to an actual automobile body collision.

4. The collision performance evaluation test method for an automobile body part according to claim 2, wherein the support jigs for supporting the intermediate portion and the rear end portion of the automobile body part individually have load cells for load measurement, and the load cells are used to measure a distribution of a deformation load generated at a time of collision deformation of the automobile body part caused by the collision punch.

5. The collision performance evaluation test method for an automobile body part according to claim 3, wherein the support jigs for supporting the intermediate portion and the rear end portion of the automobile body part individually have load cells for load measurement, and the load cells are used to measure a distribution of a deformation load generated at a time of collision deformation of the automobile body part caused by the collision punch.

6. The collision performance evaluation test method for an automobile body part according to claim 1, wherein the translation control and rotation control mechanism and the translation control mechanism reproduce a state of deformation of the automobile body part generated due to an actual automobile body collision.

7. The collision performance evaluation test method for an automobile body part according to claim 6, wherein the support jigs for supporting the intermediate portion and the rear end portion of the automobile body part individually have load cells for load measurement, and the load cells are used to measure a distribution of a deformation load generated at a time of collision deformation of the automobile body part caused by the collision punch.

8. The collision performance evaluation test method for an automobile body part according to claim 1, wherein the support jigs for supporting the intermediate portion and the rear end portion of the automobile body part individually have load cells for load measurement, and the load cells are used to measure a distribution of a deformation load generated at a time of collision deformation of the automobile body part caused by the collision punch.

9. The collision performance evaluation test method for an automobile body part according to claim 1, wherein the first or second energy-absorbing member is formed by using a cylindrical metal pipe.

10. A collision performance evaluation test apparatus for an automobile body part that performs an evaluation test of collision performance of an automobile body part, wherein
the apparatus comprises:
support jigs for supporting a front end portion, an intermediate portion, and a rear end portion of the automobile body part, respectively;
a translation control and rotation control mechanism that is provided in the support jig for supporting the front end portion;
a translation control mechanism that is provided in the support jig for supporting the intermediate portion; and
a collision punch that collides at a test speed with a front surface of an L-shaped plate included in the translation control and rotation control mechanism,
wherein
the translation control and rotation control mechanism includes:
a pair of support members having two rows of horizontal guide grooves parallel to a collision direction;
a rotary box that has an L-shaped plate including an upper surface to which the front end portion of the automobile body part is secured and a front surface with which a collision punch is made to collide and a side surface plate provided on each of both side surfaces of the L-shaped plate, and is held between the support members;
a rotary shaft pin that penetrates, as a rotary shaft of the rotary box, the side surface plate of the rotary box and one of the two rows of horizontal guide grooves;
a first compression pin that penetrates an arcuate guide groove formed about a center axis of the rotary shaft pin as an arc center and provided on the side surface plate of the rotary box and another of the two rows of horizontal guide grooves; and
a connection plate that connects the rotary shaft pin to the first compression pin so that the rotary shaft pin and the first compression pin are rotatable and movable along the horizontal guide grooves, a first energy-absorbing member is disposed inside the arcuate guide groove,
the translation control mechanism includes:
a support plate that is secured to the support jig;
a pair of slide guides that is provided on the support plate;
a disk whose outer circumferential end portion is slidably held between the support plate and the slide guides and that is used to secure the intermediate portion of the automobile body part thereto; and a translation plate whose both end portions are slidably held between the support plate and the slide guides, respectively, and that is disposed to be in contact with an upper portion of the disk, a second compression pin that is provided on one of the support plate and the translation plate so as to protrude toward another of the support plate and the translation plate is fitted into a linear guide portion that is formed on the other of the support plate and the translation plate so as to extend in a direction in which the translation plate is slidable and includes a second energy-absorbing member disposed inside, the first compression pin provided in the translation control and rotation control mechanism is configured to deform the first energy-absorbing member by a rotation of the rotary box about the rotary shaft so as to apply torque opposite to a rotation direction of the rotary box to the rotary box, and the second compression pin provided in the translation control mechanism is configured to deform the second energy-absorbing member by a translation of the translation plate so as to apply a reaction force in an opposite direction to a translation direction of the translation plate to the translation plate.

11. The collision performance evaluation test apparatus for an automobile body part according to claim 10, wherein the automobile body part is a part composed of a front pillar and a roof rail.

12. The collision performance evaluation test apparatus for an automobile body part according to claim 11, wherein the translation control and rotation control mechanism and the translation control mechanism reproduce a state of deformation of the automobile body part generated due to an actual automobile body collision.

13. The collision performance evaluation test apparatus for an automobile body part according to claim 11, wherein the support jigs for supporting the intermediate portion and the rear end portion of the automobile body part individually have load cells for load measurement, and the load cells are used to measure a distribution of a deformation load generated at a time of collision deformation of the automobile body part caused by the collision punch.

14. The collision performance evaluation test apparatus for an automobile body part according to claim 12, wherein the support jigs for supporting the intermediate portion and the rear end portion of the automobile body part individually have load cells for load measurement, and the load cells are used to measure a distribution of a deformation load generated at a time of collision deformation of the automobile body part caused by the collision punch.

15. The collision performance evaluation test apparatus for an automobile body part according to claim 10, wherein the translation control and rotation control mechanism and the translation control mechanism reproduce a state of deformation of the automobile body part generated due to an actual automobile body collision.

16. The collision performance evaluation test apparatus for an automobile body part according to claim 15, wherein the support jigs for supporting the intermediate portion and the rear end portion of the automobile body part individually have load cells for load measurement, and the load cells are used to measure a distribution of a deformation load generated at a time of collision deformation of the automobile body part caused by the collision punch.

17. The collision performance evaluation test apparatus for an automobile body part according to claim 10, wherein the support jigs for supporting the intermediate portion and the rear end portion of the automobile body part individually have load cells for load measurement, and the load cells are used to measure a distribution of a deformation load generated at a time of collision deformation of the automobile body part caused by the collision punch.

18. The collision performance evaluation test apparatus for an automobile body part according to claim 10, wherein the first or second energy-absorbing member is formed of a cylindrical metal pipe.

* * * * *